United States Patent [19]

Waters

[11] Patent Number: 5,210,113

[45] Date of Patent: * May 11, 1993

[54] COMPOSITE PARTICLE DISPERSIONS

[75] Inventor: Julian A. Waters, Goring-on-Thames, England

[73] Assignee: Imperial Chemical Industries PLC, London, United Kingdom

[*] Notice: The portion of the term of this patent subsequent to Mar. 5, 2008 has been disclaimed.

[21] Appl. No.: 555,024

[22] Filed: Jul. 20, 1990

[30] Foreign Application Priority Data

Jul. 25, 1989 [GB] United Kingdom ............. 8916944.5

[51] Int. Cl.$^5$ ............................ C08K 9/12; C08J 3/03
[52] U.S. Cl. .................................. 523/205; 523/201; 524/501
[58] Field of Search ................ 524/501; 523/201, 319, 523/200, 205

[56] References Cited

U.S. PATENT DOCUMENTS

| | | | |
|---|---|---|---|
| 3,843,585 | 10/1974 | Kangas et al. | 524/501 |
| 4,097,553 | 6/1978 | Novak. | |
| 4,110,290 | 8/1978 | Mori et al. | 524/501 |
| 4,354,001 | 10/1982 | Kuan | 524/501 |
| 4,504,609 | 3/1985 | Kuwajima et al. | 524/501 |
| 4,680,335 | 7/1987 | Chambers et al. | 524/501 |
| 4,731,409 | 3/1988 | Miwa et al. | 524/501 |
| 4,997,864 | 3/1991 | Waters | 523/319 |

FOREIGN PATENT DOCUMENTS 0195661 9/1986 European Pat. Off. .
0327199 8/1989 European Pat. Off. .

*Primary Examiner*—Joseph L. Schofer
*Assistant Examiner*—R. H. Delmendo
*Attorney, Agent, or Firm*—Cushman, Darby & Cushman

[57] ABSTRACT

A composite particle dispersion is prepared by mixing an aqueous dispersion of polymer particles which will form the particle shell with pre-formed polymer particles which will form the core at a temperature above the glass transition temperature for the shell particles. In order to ensure composite particle formation, certain interfacial energy criteria have to be satisfied for the core particle surface/shell particle surface/liquid interfaces. In order to allow the desired energy relationships to be established, the core particle surfaces include covalently attached ionic groupings which enable a permanent modification of the core particle surface to be made.

13 Claims, No Drawings

COMPOSITE PARTICLE DISPERSIONS

This invention relates to dispersions of composite particles, the particles being of the type where a first component is partially or wholly engulfed by a second component and the resulting particle is of a colloidal size, and the dispersion being a colloidally stable dispersion. Particles are generally regarded as being of colloidal size if they have a particle diameter of less than 10 μm.

Composite particle dispersions of this type are the subject of our European Publication Number 327,199, corresponding to U.S. Pat. No. 4,997,864.

Various processes for the production of composite particles are known in the art.

In one such process, composite particles are produced by polymerising monomers in the presence of core particles. This process involves chemical reactions and does not have control over location of the new polymer; it does not give complete phase separation if two polymers are used; the core particles are contaminated by reagents involved with the polymerisation and the core particles must be able to withstand the conditions necessary for the polymerisation of the second polymer. There are many examples of this process in the prior art; one example is shown in EP-A-0 195 661 and another example is discussed in a Research Report by Yi-Cherng Chen entitled "Particle morphology in seeded composite latexes" published in May 1989 by Lehigh University, Pennsylvania, USA, May 1989.

Processes are also known where composite particles are made and dried to produce powder. These processes do not result in a colloidally stable dispersion. Examples of such processes appear in US 3 161 602, US 4 800 103 and JP-A-80 89855

In another type of process shell material is precipitated onto core particles. This process does not give colloidally stable dispersions and involves the use of two liquids, one being a solvent and one being a non-solvent. Water cannot be used as the sole liquid for this process Such solvent liquids are undesirable as they are contaminants of the environment and they may give rise to hazards to users. Examples of this type of process are GB 1 138 570, U.S. Pat. No. 4,016,099 and GB 1 017 676.

It is also known to form composite particles where the shell is formed by coacervation, coagulation or complexing processes onto the surface of core particles. These processes do not give colloidally stable dispersions; they are also limited to using co-reactive polymer systems and solvent liquids usually need to be included. Examples of this type of process are shown in U.S. Pat. No. 4 097 553, U.S. Pat. No. 4 133 774 and U.S. Pat. No. 4 440 879.

Our European Publication Number 327,199, corresponding to U.S. Pat. No. 4,997,864 describes and claims a process for preparing a dispersion of composite particles, which process comprises mixing first particles with a liquid dispersion of polymer particles, the polymer particles being stable against particle-particle flocculation and agglomeration, wherein the mixing takes place at a temperature above the operative glass transition temperature of the polymer particles and under a condition where $$\frac{\gamma_{1-3} - \gamma_{1-2}}{\gamma_{2-3}} \geq \frac{1 - v_p^{\frac{1}{3}}}{v_c^{\frac{1}{3}}} \quad (I)$$

[this relationship will be referred to in this specification as Relationship I]
where
$\gamma_{1-3}$ is the interfacial energy of the first particle surface/aqueous liquid interface
$\gamma_{1-2}$ is the interfacial energy of the first particle surface/second particle interface
$\gamma$ is the interfacial energy of the second particle surface/aqueous liquid interface
$v_p$ and $v_c$ represent the relative volumes of, particle and the average first polymer particle, with $v_p + v_c = 1$ and where the first particles are able to make contact with the surfaces of the polymer particles so that when contact occurs between first particles and polymer particles, composite particles are produced as a dispersion in the liquid phase, the particles having stability against particle-particle flocculation and agglomeration.

We found difficulties in reliably producing a dispersion by the methods described in our copending application when the first particles are polymer particles and are relatively hydrophilic and where the liquid is aqueous. We have however surprisingly found that a substantial improvement is possible in such cases, especially when the first particles are relatively hydrophilic, by including covalently attached ionic groupings on the surface of the first particles.

Accordingly, the present invention provides a process for preparing a stable aqueous dispersion of composite particles, which process comprises mixing an aqueous dispersion of first polymer particles, where the particle surfaces include covalently attached ionic groupings to give the particles colloidal stability prior to the mixing, with an aqueous colloidally stable dispersion of second polymer particles, and wherein the mixing takes place at a temperature above the operative glass transition temperature of the second particles and under a condition where $$\frac{\gamma_{1-3} - \gamma_{1-2}}{\gamma_{2-3}} \geq \frac{1 - v_p^{\frac{1}{3}}}{v_c^{\frac{1}{3}}}$$

where
$\gamma_{1-3}$ is the interfacial energy of the first particle surface/aqueous liquid interface
$\gamma_{1-2}$ is the interfacial energy of the first particle surface/second particle interface
$\gamma_{2-3}$ is the interfacial energy of the second particle surface/aqueous liquid interface
$v_p$ and $v_c$ represent the relative volumes of, respectively, the average second polymer particle and the average first polymer particle, with $v_p + v_c = 1$
and where the first particles are able to make contact with the surfaces of the second particles so that when contact occurs between first particles and second particles, composite particles are produced as a stable dispersion in the aqueous phase, the composite particles having colloidal stability.

Colloidal stability means that collision between particles does not lead to permanent contact between the particles; particle-particle flocculation and agglomeration does not occur and the particles remain free to move individually within the dispersion.

Methods for measuring the surface energy expression $(\gamma_{1-3} - \gamma_{1-2})/\gamma_{2-3}$ and for calculating the expression $(1-v_p^{\frac{1}{3}})$ are described in detail in the European Publication Number 327,199, corresponding to U.S. Pat. No. 4,997,864.

Using this process, it becomes possible to prepare composite particles as aqueous dispersions, where the core or encapsulated polymer is relatively hydrophilic such as poly(vinyl acetate), and in a preferred form of the invention, the first particles are more hydrophilic than the second particles. Composite particles of this type cannot be prepared by prior art methods which involve polymerisation to form a second polymer in the presence of particles of a first polymer (see for example EP-A-0 195 661) or which involve precipitation of one polymer onto particles of another polymer.

We believe that our process has the ability to prepare a dispersion of composite particles of this type because the interfacial energies for the surface of the first particle (to be encapsulated) can be altered in an appropriate way during the process and because the changes to the interfacial energies are permanent and not merely transitory.

Our process has important advantages over the prior art processes of which we are aware. Our process is essentially a mixing process and no chemical reaction or polymerisation is required. No solvent liquid is required; the process can b=operated with water as the sole liquid. The composite particles produced have complete internal phase separation and the internal boundaries are sharp. The thickness of the encapsulating shell can be controlled simply by selecting the appropriate size for the first and second particles. The first particles, which become encapsulated, retain their shape and size in the composite particles and are entirely free from contamination with reagent residues or solvent liquids which may be introduced via prior art processes. Our process is thermodynamically-driven and does not require an energy input.

We believe that the mechanism of the process is as follows. The second particles retain colloidal stability throughout; ie contacts between these particles do not develop so tht flocculation of these particles does not occur. However, eitehr because the surface of the first particles is modified during the process or because the first particles and second particles are stabilised by a different means, there is not barrier to contact between a second particle and a first particle; we term this "heterocontact". Contact between the disimilar particles is followed by "engulfment" or spreading of the second polymer oer the first particle to produce a "core-shell" structure, because this reduces the total interfacial energy for the two particles. (The theory supporting this is detailed in our European Publication Number 327,199, corresponding to U.S. Pat. No. 4,997,864). The resulting composite particle has the second polymer particle component at its surface, retains colloidal stability and is stable against flocculation with other composite particles and with second polymer particles.

Where the first particles comprise relatively hydrophilic polymer, with covalently attached ionic groups, it is usually necessary during the process to modify the surface to make it more hydrophobic, that is to increase the interfacial energy associatd with the core particle-water interface ($\gamma_{1-3}$) in order to ensure that Relationship (I) is fulfilled. This may conveniently be done by adding a surfactant or polymer carrying an opposite charge to the ionic groups attached at the surface of the first particles. If this modification of the particle surface leads to fulfillment of Relationship (I), engulfment of the first particle by a second polymer will be thermodynamically driven by a reduction in the total interfacial energy for the two particles.

However if the ionic groups are not covalently attached at the particle surface, ie the first particles are not in accordance with the invention, then addition of a component carrying an opposite charge may fail to promote engulfment of the first polymer by the second. In this event we believe that the relationship (I) is not fulfilled, at least no more than in a transitory sense, because although the component of opposite charge combines with the ionic groups at the surface of the first particle, the combined materials desorb or otherwise fail to remain as a complete surface layer. This desorption cannot occur if the first particle surface has ionic groupings which are covalently attached to the surface.

The first particles themselves have colloidal stability, and the component added to modify the surface of the first particles may also reduce or eliminate the stability of the first particles and can be used to promote the desired heterocontact with the second particles.

Colloidal stability can be either
(i) ionic, that is generated by ionic groups or surfactants at the particle surfaces, or
(ii) steric, that is generated by diluent-soluble, oligomeric or polymeric chains which are adsorbed or linked to the particle surface.

The second polymer particles preferably have steric colloidal stability, that is the surface composition includes oligomer or polymer components soluble in the liquid phase. The soluble components at the surface also serve to make the particles more hydrophilic (decreasing $\gamma_{2-3}$) which is desirable for fulfillment of the relationship (I). The second polymer particles may also have surface ionic groups, either anionic or cationic, which will contribute to the colloidal stability of the particles. These ionic groups may be of opposite or the same charge as on the surface of the first particles.

The first particles are preferably in the form of an aqueous dispersion prior to being mixed with the second particle dispersion.

The polymer particles (either the first or the second particles) may b=made by emulsion or dispersion polymerisation processes.

Water may be used as the sole liquid in the dispersion of the second particles and derived composite particles and also in a dispersion of the first particles. Water miscible liquids such as alcohols may be included if desired, for example to modify the rate of drying when the dispersion of composite particles produces a film on evaporation.

The polymer particles may include an organic liquid residing at least partly inside the polymer particles Such organic liquids may be desirable either to reduce the operative glass transition temperature of the second particles or for example to assist film formation by acting as a plasticiser when the dispersion of composite particles is dried.

The process may be carried out by slowly adding a dispersion of first particles to the dispersion of second particles. Components to modify the surface of the first particles, as solutions or dispersions, may be added prior to or after the addition of the first particles or preferably may be added simultaneously and separately when the first particles are added to the dispersion of second particles.

A component bearing a charge opposite to the charge responsible for stabilisation of the first particles can be added to the mixture to destabilise the first particles, and this compound can be selected so as to increase the hydrophobic nature of the first particles. The compound may be a surfactant, and may be in the form of a polymer.

Alternatively, an electrolyte compound may be added to the mixture to destabilise the charged first particles.

Where an additional component is added to the mixture to destabilise the first particles, the further component may be a polymer which includes the same polymeric components as are present in the second polymer particles. This, we believe, reduces the interfacial energy at the first particle surface/second particle interface ($\gamma_{1-2}$) which may be useful in order to fulfil relationship (I).

The process can conveniently be carried out with a ratio of first particles to second particles of approximately 1:1. However a wide range of other first particle:second particle ratios have been successfully used, ranging from about 10:1 to 1:10 and even wider ranges may be possible.

The respective sizes of the first and second particles may be similar or different. There is no obvious upper limit to the ratio of the diameter of the second particles to the diameter of the first particles, but to give dispersions of particles of colloidal size, the second particle diameter should not exceed approximately 10 μm. However, where the second particles are smaller than the first particles, engulfment of the first particles by the second may lead to excessive spacing out of the steric-/ionic stabilizer on the surface of the second particles when the particle spreads around the first particle and in order to maintain colloidal stability for the composite particles it may be necessary either to employ more second particles than first particles or to include additional surfactant during the process.

According to a second aspect of the invention, there is provided a process for preparing a dispersion of composite particles in an aqueous phase, the composite particles having colloidal stability, which process comprises mixing an aqueous dispersion of first polymer particles, where the particle surfaces include covalently attached ionic groupings to give the particles colloidal stability prior to the mixing, with an aqueous dispersion of second polymer particles where the second particles have colloidal stability; wherein the mixing takes place at a temperature above the operative glass transition temperature of the second particles and where $$\theta < 90°$$

and $$\cos \theta_p \geq \frac{1 - v_p^{\frac{2}{3}}}{v_c^{\frac{2}{3}}}$$

where $v_p$ and $v_c$ represent the relative volumes of, respectively, the average second particle and the average first particle, with $v_p + v_c = 1$ and where $\theta_p$ is the contact angle made by the material of the second particles in an environment of the liquid phase at a surface which has the surface composition of the first particles.

A method for measuring the contact angle $\theta$, is detailed in our European Publication Number 327,199, corresponding to U.S. Pat. No. 4,997,864.

The invention extends to stable aqueous dispersions of composite particles made by the process set forth above.

According to a third aspect of the invention, there is provided a process for making a dispersion of polymer particles of colloidal size, in which process ionic groupings are covalently attached to the particle surfaces in order to provide sites at which interfacial energy modifying components can be permanently attached.

The particles, which will form the first particles in the process set forth above for preparation of composite particles, may be prepared in the presence of ionic surfactant which is copolymerisable because it includes a double bond which can participate in addition polymerisation. Alternatively the particles may be formed by so called "surfactant-free" methods in which ionic initiators are used and the residues from the initiation provide ionic colloidal stability for the particles; these particles carry disadvantages in that they are very vulnerable to shear-induced flocculation and extra care is required when preparing them, especially at high concentrations. Ionic monomers such as acrylic acid or methacrylic acid may be used to provide the particles with covalently attached ionic groups but it is difficult to formulate particles of this sort to give dispersions with only little coagulation. These particles also are very vulnerable to shear-induced flocculation. It is advantageous to prepare the particles in the presence of co-polymerisable ionic polymer which is soluble in the aqueous phase. Such ionic polymers may be, produced by reacting polycarboxylic acid with compounds which include an epoxy ring and a copolymerisable double bond.

It is especially advantageous to prepare the first particles in the presence of copolymerisable surface active ionic polymer. Suitable surface active polymers are graft or block copolymers where one polymer is soluble in the aqueous medium and the other is not, and where one or more of the polymer components has copolymerisable double bonds.

The invention also extends to colloidal size composite particles made by the process above. The particles may or may not be in dispersion. The composite particles comprise two or more dissimilar polymers which are phase separated from one another within the particles and have an internal boundary between the two polymers. The invention further extends to composite particles which comprise a relatively hydrophilic polymer encapsulated by a relatively hydrophobic polymer. By relatively hydrophilic polymer we mean a polymer which has a lower interfacial energy when interfacing with water, compared to the other (relatively hydrophobic) polymer. Where it is inconvenient to measure the relative interfacial energies, the relatively hydrophilic polymer may be identified by reference to published values for the surface tensions of the two polymers. The relatively hydrophilic polymer has a surface tension which is higher and closer to the surface tension of water compared to the other polymer. Values for surface tensions of polymers are given for example in "Polymer Interface and Adhesion" by Souheng Wu, published by Marcel Dekker Inc. at page 184.

Any polymer may be used to provide first polymer particles (which will become the core particles) provided that the polymer is available in or can be made in particulate form, with covalently attached ionic groups at the particle surface. The polymers include those derived from addition polymerisation of unsaturated monomers.

The polymer may include or comprise, but is not limited to, acrylic acid or any ester such as methyl acrylate, ethyl acrylate, propyl acrylate, butyl acrylate, 2-ethyl hexyl acrylate, glycidyl acrylate; methacrylic acid or any ester such as methyl methacrylate, ethyl methacrylate, propyl methacrylate, butyl methacrylate, lauryl methacrylate, cetyl methacrylate, stearyl methacrylate, ethylene glycol dimethacrylate, tetraethylene glycol dimethacrylate, glycidyl methacrylate, N,N-(methacryloxy hydroxy propyl)-(hydroxyalkyl) amino ethyl amidazolidinone; allyl esters such as allyl methacrylate; itaconic acid, crotonic acid or esters; maleic acid or esters such as dibutyl maleate, dioctyl maleate, diethyl maleate; styrene or substituted derivatives such as ethyl styrene, butyl styrene, divinyl benzene; monomer units which include an amine functionality such as dimethyl amino ethyl methacrylate, butyl amino ethyl methacrylate; monomer units which include an amide functionality such as acrylamide or methacrylamide; vinyl ethers, vinyl thioethers, vinyl alcohol, vinyl ketones, vinyl halides such as vinyl chloride, vinyl fluoride, vinylidene chloride, vinylidene fluoride, tetrafluoroethylene; vinyl esters such as vinyl acetate, vinyl versatate; vinyl nitriles, for example acrylonitrile, methacrylonitrile; diene monomer units such as butadiene, isoprene; allyl ethers such as allyl glycidyl ether.

It will be apparent from the description of the process of our invention that any polymer may be used to provide second polymer particles provided a stable dispersion of the polymer particles is available or can be made and that the operative glass transition temperature is, or is modified to be, lower than the temperature at which the process is to be operated. The polymer may include or comprise, but is not limited to, acrylic acid or any ester such as methyl acrylate, ethyl acrylate, propyl acrylate, butyl acrylate, 2-ethyl hexyl acrylate, glycidyl acrylate; methacrylic acid or any ester such as methyl methacrylate, ethyl methacrylate, propyl methacrylate, butyl methacrylate, lauryl methacrylate, cetyl methacrylate, stearyl methacrylate, ethylene glycol dimethacrylate, tetraethylene glycol dimethacrylate, glycidyl methacrylate, N,N-(methacryloxy hydroxy propyl)-(hydroxyalkyl) amino ethyl amidazolidinone; allyl esters such as allyl methacrylate; itaconic acid, crotonic acid or esters; maleic acid or esters such as dibutyl maleate, dioctyl maleate, diethyl maleate; styrene or substituted derivatives such as ethyl styrene, butyl styrene, divinyl benzene; monomer units which include an amine functionality such as dimethyl amino ethyl methacrylate, butyl amino ethyl methacrylate; monomer units which include an amide functionality such as acrylamide or methacrylamide; vinyl ethers, vinyl thioethers, vinyl alcohol, vinyl ketones, vinyl halides such as vinyl chloride, vinyl fluoride, vinylidene chloride, vinylidene fluoride, tetrafluoroethylene; vinyl esters such as vinyl acetate, vinyl versatate; vinyl nitriles, for example acrylonitrile, methacrylonitrile; diene monomer units such as butadiene, isoprene; allyl ethers such as allyl glycidyl ether. Alternatively, the second polymer may be a polyoxide such as poly(ethylene oxide), poly(propylene oxide); a polyester such as poly(ethylene terephthalate), alkyd; polyurethane; polysulfonate; polysiloxane such as poly(dimethyl siloxane); polysulfide; poly(acetylene); polysulfone; polysulphonamide; polyamide such as poly(caprolactam), poly(hexamethylene adipamide); polyimine; polyurea; heterocyclic polymer such as polyvinylpyridine, polyvinyl pyrrolidinone; naturally occurring polymer such as natural rubber; gelatin; carbohydrate such as cellulose, alkyl cellulose; polycarbonate; polyanhydride; polyalkene such as ethylene-propylene copolymer.

Ionic polymers suitable for use in the invention may include any of the polymer components listed for the second particles and may also include or comprise acidic polymer components such as acrylic acid, methacrylic acid, itaconic acid, crotonic acid and sodium or potassium or other salts of these, glycidyl methacrylate, N,N -(methacryloxy hydroxy propyl)-(hydroxyalkyl) amino ethyl amidazolidinone, dimethyl amino ethyl methacrylate, butyl amino ethyl methacrylate and other basic monomers and their respective ammonium salts; acrylamide, methacrylamide.

Copolymerisable surfactants and copolymerisable ionic polymers include at least one double bond which can participate in addition polymerisation; such double bonds are found for example in acrylates, methacrylates and allyl compounds.

Surface-active polymers include in addition, polymer components which are insoluble in aqueous media; polymer components of this type are readily selected by those skilled in the art from the list of polymers given above for the second polymer particles.

Dispersions of the polymer particles in an aqueous liquid phase are used in our process. The particles should not dissolve in the liquid phase. The second particles should retain colloidal stability in the liquid phase. Liquids may be selected from a very wide range. Liquids which are especially suitable include, without any limitations to these, water, methanol, ethanol, propanol, ethylene glycol, propylene glycol, glycerol, ethoxypropanol, propylene glycol methyl ether, ethoxyethanol, butoxyethanol.

The dispersion of second polymer particles is preferably a stable latex which may be synthetic or naturally occurring.

EXAMPLE 1

A copolymerisable, ionic, surface-active polymer was prepared as follows:

| STAGE 1 | Parts by weight (gms) |
| --- | --- |
| A ethanol | 1358 |
| azodiisobutyronitrile (ADIB) | 3.4 |
| B acrylic acid | 1125 |
| ADIB | 11.2 |
| primary octyl mercaptan (POM) | 5.6 |
| C ADIB | 1 |

A glass, round bottom reaction vessel (5 liter capacity) was fitted with lid, condenser, stirrer, thermometer and nitrogen supply.

Charge A was placed in the vessel and the temperature raised to reflux and held for 30 minutes. The reflux was maintained and mix B was added at a steady rate over 2 hours. Reflux was continued for a further 30 minutes before adding C and then refluxing for a further 45 minutes. The product which was a homopolymer polyacrylic acid of relatively low molecular weight was allowed to cool and to stand in contact with air.

The Stage I intermediate product was a clear, viscous solution with a polymer content of 46.2%.

| STAGE II | Parts by weight |
|---|---|
| Stage I product (solution of polyacrylic acid) | 2507 |
| glycidyl methacrylate | 22.5 |
| Armeen DMCD* | 15.1 |

The mix was raised to reflux, held for 5 hours and then allowed to cool.

During this stage, the epoxy rings of the glycidyl methacrylate react with some of the carboxylic acid groups to leave pendant double bonds which are available to prepare block or graft copolymers in Stage III.

The Stage II intermediate product was a yellow, viscous solution with a polymer content of 46.7%.

| STAGE III | | Parts by weight |
|---|---|---|
| A | ethanol | 400 |
|  | ADIB | 0.2 |
| B | ethyl acrylate | 335 |
|  | ADIB | 3.8 |
|  | POM | 16.3 |
|  | Stage II product | 806 |
|  | ethanol | 200 |
| C | ADIB | 0.4 |

Charge A was raised to reflux and held for 30 minutes With the reflux maintained, mix B was added at a steady rate over 2½ hours. Reflux was continued for a further 1 hour, C was added and the reflux continued for a further 1 hour. The product was allowed to cool and to stand in air.

During Stage III, the ethyl acrylate polymerised and formed an ill-defined block or graft copolymer with most of the pendant double bonds from Stage II consumed. The copolymer still possessed reactive carboxylic groups from the polyacrylic acid.

The Stage III intermediate product was a viscous solution with no gel content and with a polymer content of 40.1%.

| STAGE IV | Parts by weight |
|---|---|
| Stage III product | 1762 |
| glycidyl methacrylate | 7.2 |
| Armeen DMCD* | 5.4 |

The temperature was raised to reflux and held for 7 hours. In Stage IV, more epoxy rings are available to react with some carboxylic groups to leave pendant double bonds. These double bonds are then the points by which the Stage IV product, which is a surfactant, becomes covalently attached to the first polymer particles.

The product was a viscous solution with no gel content and with a polymer content of 40.5%.

*Armeen DMCD is a Trade Mark of the Akzo company. The compound is a catalyst for the ring opening reaction between the carboxylic acid and the epoxy compound.

EXAMPLE 2

A dispersion of ionically-stabilised poly(vinyl acetate) particles was prepared using the copolymerisable, ionic, surface-active polymer made in Example 1.

The apparatus comprised a glass culture vessel with parallel sides (2 liter capacity), fitted with lid, turbine stirrer, thermometer, nitrogen supply and condenser. The glass vessel was supported with the lower one third immersed in a hot-water bath.

| | | Parts by weight |
|---|---|---|
| A | water (demineralised) | 687 |
|  | Example 1 product | 60 |
|  | 1 molar alcoholic potassium hydroxide | 98.3 |
| B | vinyl acetate | 28.4 |
| C | ammonium persulphate | 0.6 |
|  | water | 11.8 |
| D | vinyl acetate | 534.1 |
|  | ammonium persulphate | 1.8 |
|  | water | 35.7 |

Charge A was raised to 65° C. Compound B was added. After 10 minutes C was added and the temperature held for 45 minutes after which time, the content comprised a dispersion of "seed" polymer particles. Addition of D and E was started and these were added separately and simultaneously using two peristaltic pumps at a steady rate over a period of 2½ hours. The temperature was maintained for a further 45 minutes and the dispersion was then allowed to cool.

The product was a colloidally stable dispersion in water of PVA particles (first particles) which were anionically stabilised. The polymer content was 39.2%. The mean particle diameter was 515 nm as determined using a Coulter Nanosizer particle-sizing-instrument. The dispersion did not contain any significant amount of coagulum and there were no polymer deposits on the walls of the reaction vessel or on the stirrer

EXAMPLE 3

A dispersion of ionically-stabilised, internally crosslinked poly(vinyl acetate) particles was prepared, by including a difunctional monomer in the formulation to produce internal cross-linking in the particles.

The difunctional monomer was tetraethylene glycol dimethacrylate.

| | | Parts by weight |
|---|---|---|
| A | water (demineralised) | 687 |
|  | Example 1 product | 60 |
|  | 1 molar alcoholic potassium hydroxide | 98.3 |
| B | vinyl acetate | 27.8 |
|  | tetraethylene glycol dimethacrylate | 0.57 |
| C | ammonium persulphate | 0.59 |
|  | water | 11.8 |
| D | vinyl acetate | 523 |
|  | tetraethylene glycol dimethacrylate | 10.7 |
| E | ammonium persulphate | 1.79 |
|  | water | 35.7 |

The apparatus and process was the same as used in Example 2.

The product was a stable dispersion of internally cross-linked PVA particles (first particles) which were anionically stabilised against flocculation and aggregation. The polymer content was 39.1%. The mean particle diameter was 662 nm as measured using a Coulter Nanosizer.

EXAMPLE 4

A dispersion of ionically-stabilised poly(vinyl acetate) particles was prepared using copolymerisable ionic polymer (polyacrylic acid with pendant double bonds) as made at Stage II in Example 1.

|   |   | Parts by weight |
|---|---|---|
| A | water | 800 |
|   | Example 1, Stage II intermediate | 20 |
|   | 1 molar alcoholic potassium hydroxide | 49.1 |
|   | amonium persulphate | 1.0 |
| B | vinyl acetate | 200 |

The apparatus used was as in Example 2. Components A were charged to the reactor and stirred and B was added. The mix was purged with nitrogen for 1 hour. The temperature was raised to 65° C. and held for 2 hours.

The product was a dispersion of ionically-stabilised particles with a mean size of approximately 1000 nm. The polymer content was 35.5%.

EXAMPLE 5

Composite particles were made by mixing a dispersion of first polymer particles, comprising poly(vinyl acetate) with a dispersion of second polymer particles comprising vinyl acetate/vinyl versatate copolymer, in the presence of a further component which reduced the stability of the first particles and altered the interfacial energies.

The dispersion of first particles was prepared as in Example 2 using the copolymerisable, ionic, surface-active polymer as made in Example I. The particles were anionically stabilised against flocculation and aggregation. The mean particle diameter was 15 nm and the polymer content of the dispersion was 39.2%.

The dispersion of second particles was prepared by polymerising a 80/20 (w/w) mixture of vinyl acetate and vinyl versatate in water in the presence of methoxy poly (ethylene oxide) methacrylate of approximately 2000 molecular weight. The particles were largely sterically stabilised by the soluble poly(ethylene oxide) chains which were covalently attached to the surfaces of the particles and partly stabilised by anionic groups which arose from the ionic initiator which had been used to generate polymerisation. The mean particle diameter was 650 nm and the polymer content of the dispersion was 41.9%.

|   |   | Parts by weight |
|---|---|---|
| A | dispersion of first particles (from Example 2) | 20.0 |
| B | dispersion of second particles | 35.6 |
| C | 0.1 molar solution of dodecyl trimethyl ammonium bromide (DOTAB) | 23.4 |

The ratio of first particles:second particles was approximately 1:1 by number.

Dispersion B was charged to a beaker and maintained at 25° C. with stirring throughout the process. Dispersion A and component C were added separately but simultaneously using syringe pumps; they were added at a steady rate over 1½ hours.

This product was a colloidally stable dispersion of composite particles with a small number of particle floccs present. It was shown by tests which are described below under the heading Test Method that the composite particles were sterically stabilised and that ionically-stabilised particles were not present in significant numbers. This indicates that the ionically-stabilised first particles had been engulfed by the sterically-stabilised second particles, and as a result that composite particles had been formed.

EXAMPLE 6

In this comparative Example, Example 5 was repeated except that component C was omitted.

The product was a stable dispersion. However the tests showed that both ionically-stabilised and sterically-stabilised particles remained and this indicates that the first particles with covalently attached ionic groupings at the surface had not been encapsulated by the second particles.

EXAMPLE 7

Composite particles were made where the first particles comprised internally cross-linked poly(vinyl acetate) as prepared in Example 3.

The second particles were as used in Example 5. A random copolymer of vinyl acetate/vinyl versatate/dimethyl amino ethyl methacrylate (55/40/5 w/w) was used as the component (C) in place of DOTAB to modify surface energies and stability of the first particles.

|   |   | Parts by weight |
|---|---|---|
| A | dispersion of first particles (as made in Example 3) | 23.6 |
| B | dispersion of second particles | 20.0 |
| C | amino-contianing random copolymer as 45.5% solution in ethanol | 19.7 |

The ratio of first particles:second particles ≈1:1 by number. The method used was as in Example 5.

The product was a colloidally stable dispersion with a small number of particle floccs. The tests showed that the particles in the dispersion were sterically-stabilised and that ionically-stabilised particles were not present in significant numbers.

TEST METHODS used in Example 5, 6 and 7

Two tests were used to determine whether particular colloidally stable particle dispersions were sterically stabilised or ionically-stabilised.

TEST 1

A small sample of dispersion was placed between the cone and plate platens of a viscometer and subjected to a shear rate of 10,000 sec$^{-1}$ for 90 seconds. The apparent viscosity was monitored during this time. Generally, sterically-stabilised particle dispersions retain stable under this test and show only a small increase in apparent viscosity whereas ionically-stabilised particles flocculate and give a large increase in apparent viscosity.

TEST 2

A sample of dispersion was mixed with an equal volume of a 10% solution of calcium chloride in water. Generally, sterically-stabilised particle dispersions remain stable under this test whereas ionically-stabilised particles flocculate.

TEST RESULTS

The dispersions of first particles, the dispersions of second particles and the product dispersions from Examples 5, 6 and 7 were subjected to these tests.

|  |  | Test 1 | Test 2 |
|---|---|---|---|
| Example 5 | First particles | x | x |
|  | Second particles |  |  |
|  | Final particles | slight flocc. |  |
| Example 6 | First particles | x | x |
|  | Second particles |  |  |
|  | Final particles | x | x |
| Example 7 | First particles | x | x |
|  | Second particles |  |  |
|  | Final particles |  |  |

- remained stable
x - flocculated

These results indicate that encapsulation of the first particles by the second particles (which were primarily sterically-stabilised) was largely achieved in Examples 5 and 7 but not in comparative Example 6.

EXAMPLE 8

Composite particles were made by mixing a dispersion of poly(vinyl acetate) particles which were stabilised with copolymerisable, anionic polymer with a dispersion of acrylic particles in the presence of a cationic surfactant to reduce stability and alter the interfacial energies.

A dispersion of first particles (PVA) was prepared by a process similar to Example 4 except that the amount of copolymerisable, ionic polymer was increased. The mean particle diameter was 470 nm and the polymer content of the dispersion was 37.9%.

A dispersion of second particles had been prepared by polymerising methyl methacrylate/2-ethyl hexyl acrylate/acrylic acid (51/49/1 w/w) in an aqueous solution of a poly ethoxylate non-ionic surfactant and sodium carboxy methyl cellulose as protective colloid. The mean particle size was 660 nm and the polymer content of the dispersion was 58.9%.

|  | Parts by weight |
|---|---|
| A dispersion of first particles | 20.0 |
| B dispersion of second particles | 34.0 |
| C 0.1 molar solution of dodecyl trimethyl ammonium bromide | 7.2 |

The ratio of first particles:second particles was approximately 1:1 by number.

Dispersion B was charged to a beaker and stirred at 25° C. Dispersion A and component C were added separately and simultaneously to the beaker at a constant rate over 1½ hours.

The product was a colloidally stable dispersion of composite particles with a small number of aggregates present. Characterization using a disc centrifuge indicated that the final dispersion comprised particles which were slightly larger than the second particles.

EXAMPLE 9

Composite particles were made by mixing a dispersion of first polymer particles comprising poly(butyl acrylate) with a dispersion of second particles comprising poly(ethyl acrylate). Prior to the process the first particles had ionic colloidal stability arising from ionic groups which were residual from the ionic initiator and which resided at the end of the particle polymer chains and which therefore were covalently attached. A further component was added during the process to modify the surface of the first particles.

The dispersion of first particles was prepared by polymerising butyl acrylate in water with ammonium persulphate as initiator and in the absence of any surfactant or preformed polymer. The mean particle diameter was 220 nm and the polymer content of the dispersion was 3%. The dispersion was colloidally stable.

The dispersion of second particles was prepared by polymerising ethyl acrylate in a dilute solution of an amphipathic graft copolymer in water, using a non-ionic initiator (azo-diisobutyrnitrile). The graft copolymer comprised 50/45/5 methoxy poly(ethyleneoxide) methacrylate (M.W=2000)/butyl acrylate/ dimethylaminoethyl methacrylate; this had previously been prepared by polymerisation in ethanol to give a 45% solution/dispersion in ethanol. The ratio of graft copolymer to poly(ethyl acrylate) in the dispersion was 3.8:100. The particles had steric colloidal stability. The mean particle diameter was 250 nm and the polymer content of the dispersion was 3%.

|  |  | Parts by weight |
|---|---|---|
| A | dispersion of first particles | 7.1 |
| B | dispersion of second particles | 10.0 |
| C | 0.01 molar solution of DOTAB | 1.6 |

The ratio of first particles to second particles was approximately 1:1 by number. The process was operated as in Example 5. The product was a colloidally stable dispersion of composite particles with a mean diameter of 340 nm.

EXAMPLE 10

This was similar to Example 9 except that the first particles comprised poly(vinyl acetate).

The first particles were stabilised by covalently attached ionic initiator residues as in Example 9. The mean particle diameter was 230 nm and the polymer content of the dispersion was 3%.

The second particles were as in Example 9. The mean particle diameter was 250 nm and the polymer content of the dispersion was 3%.

|  |  | Parts by Weight |
|---|---|---|
| A | dispersion of first particles | 8.2 |
| B | dispersion of second particles | 10.0 |
| C | 0.01 molar solution of DOTAB | 1.5 |

The ratio of first particles to second particles was approximately 1 to 1 by number.

The product was a colloidally stable dispersion of composite particles with a mean size of 290 nm.

EXAMPLE 11

Composite particles were made where the first particles comprised poly(ethyl acrylate) and were stabilised by covalently attached ionic groups. The second particles comprised poly(butyl acrylate); that is the polymer of the first particles was relatively hydrophilic (surface tension=37.0 dyne.cm$^{-1}$ at 20° C.) compared to the second polymer (surface tension=33.7 dyne.cm$^{-1}$ at 20° C.).

The first particles were prepared by polymerising ethyl acrylate in water without surfactant, using a high level of ammonium persulphate as initiator (25 parts of initiator to 100 parts of the monomer). The mean particle size was 170 nm and the polymer content of the dispersion was 3%.

The second particles were prepared using a solution of the amphipathic graft copolymer as in Example 9. The ratio of graft copolymer to poly(butyl acrylate) in the dispersion was 4.7:100. The mean particle diameter was 190 nm and the polymer content of the dispersion was 3%.

| | Parts by Weight |
|---|---|
| A dispersion of first particles | 7.1 |
| B dispersion of second particles | 10.0 |
| C 0.01 molar solution of DOTAB | 1.6 |

The ratio of first particles to second particles was approximately 1:1 by number.

The process was operated as in Example 5 with very gentle stirring. The product was a colloidally stable dispersion of composite particles with a very small proportion of the polymer present as aggregates. It is considered that these aggregates were produced as a result of shear-induced flocculation of a small proportion of the core particles during the stirring.

EXAMPLE 12

In this comparative example, Example 11 was repeated except that component C (which modified the surface of the first particles) was omitted. The product was a dispersion with some flocculated aggregates. A portion of the product was decanted into a glass vial and capped. A sample of similar size was taken from the product of Example 11. The two capped glass vials were shaken vigorously by hand for one minute. The dispersion from Example 11 remained stable and no flocculation or aggregation was evident. However the dispersion from this comparative example gave a considerable amount of flocculation and aggregation, indicating that the core particles (which flocculate on vigorous shaking) had not been encapsulated by the second particles (which do not flocculate on shaking).

EXAMPLE 13

Comparative experiments were conducted in which the ionic groups at the surface of the first particles were not covalently attached at the particle surface but were able to desorb if this was favoured when conditions changed. Poly(ethyl acrylate) (PEA) (relatively hydrophilic) and poly(butyl acrylate) (PBA) were used as polymers.

The first polymers were prepared by polymerisation in water using a non-ionic initiator (azodiisobutyronitrile) and a conventional anionic surfactant (dioctyl sodium sulpho succinate) which was free to adsorb or desorb from the particle surface.

The second particles were prepared using amphipathic graft copolymer and non-ionic intiator as in Examples 9 and 11.

In each experiment, the ratio of first particles : second particles was approximately 1:1 by number and the process was operated as in Example 5 except that in two experiments component C (DOTAB solution) was omitted.

The results are set out in the following Table:

TABLE

| Expt No. | First Particle Polymer | Second Particle Polymer | Component C (DOTAB soln) | Observations | Result |
|---|---|---|---|---|---|
| 1 | PEA D = 210 | PBA D = 270 | present | Progressive flocculation throughout process | FAILED |
| 2 | PEA D = 210 | PBA D = 270 | absent | Gross flocculation developed within 1 hour after process | FAILED |
| 3 | PBA D = 190 | PEA D = 250 | present | No flocculation was observed. Product was colloidally stable dispersion of composite particles. | SUCCESSFUL |
| 4 | PBA D = 190 | PEA D = 250 | absent | No flocculation was observed. Product was colloidally stable dispersion of composite particles. | SUCCESSFUL |

D is mean diameter in nm as dertermined using a Coulter Nanosizewr particle sizing instrument.

With those systems in which ionic groups were not covalently attached at the surface of the first particles, the process was unsuccessful when the first particles comprised relatively hydrophilic polymer but was successful when the first polymer was relatively hydrophobic.

We claim:

1. A process for preparing a stable aqueous dispersion of composite particles, which process comprises mixing an aqueous dispersion of first polymer particles, where the particle surfaces include covalently attached ionic groupings to give the particles colloidal stability prior to the mixing, with an aqueous colloidally stable dispersion of second polymer particles, and wherein the mixing takes place at a temperature above the operative glass transition temperature of the second polymer particles and under a condition where $$\frac{\gamma_{1-3} - \gamma_{1-2}}{\gamma_{2-3}} \geq \frac{1 - v_p^1}{v_c^1}$$

Where $\gamma_{1-3}$
is the interfacial energy of the first polymer particle surface/aqueous liquid interface $\gamma_{1-2}$ is the interfacial energy of the first polymer particle surface/second polymer particle interface $\gamma_{2-3}$ is the interfacial energy of the second particle surface/aqueous liquid interface $V_p$ and $V_c$ represent the relative volumes of, respectively, the average second polymer particle and the average first polymer particle, with $V_p + V_c = 1$ and where the first polymer particles are able to make contact with the surfaces of the second polymer particles so that when contact occurs between first polymer particles and second polymer particles, composite particles are produced as a stable dispersion in the aqueous phase, the composite particles having colloidal stability.

2. A process according to claim 1, wherein the first polymer particles are more hydrophilic than the second polymer particles.

3. A process according to claim 1, wherein a surfactant is attached to or formed on the ionic groupings to produce the desired interfacial energy conditions at the interfaces.

4. A process according to claim 1, wherein the second polymer particles have a surface composition which includes oligomer or polymer components soluble in the liquid phase sufficient to give the second polymer particles a hydrophibic surface.

5. A process according to claim 1, wherein the first polymer particles or the second polymer particles or both are made by an emulsion polymerisation process.

6. A process according to claim 1, wherein the second polymer particles include an organic liquid residing at least partly inside the second polymer particles.

7. A process according to claim 1, in which the dispersion of first polymer particles is added slowly to the dispersion of second polymer particles.

8. A process according to claim 1, wherein the second polymer particles are at least partly sterically stabilised.

9. A process according to claim 1, wherein a compound of charge opposite to the charge responsible for stabilisation of the first polymer particles can be added to the mixture to destabilise the first polymer particles, and this compound can be selected so as to increase the hydrophobic nature of the first polymer particles.

10. A process according to claim 9, wherein the compound of charge opposite to the charge responsible for stabilisation of the first polymer particles is a surfactant, and is in the form of a polymer.

11. A process according to claim 9, wherein an electrolyte compound is added to the mixture to destabilise the charged first polymer particles.

12. A process according to claim 1, wherein a further component is added to the mixture of destabilise the mixture, which further component is a polymer which has monomer units which are common to both the further component and to the second polymer particles.

13. A process according to claim 1, wherein the process is carried out with a ratio of first polymer particles to second polymer particles of approximately 1:1.

* * * * *